(12) United States Patent
Graff et al.

(10) Patent No.: US 12,508,971 B2
(45) Date of Patent: Dec. 30, 2025

(54) GROUND LEVEL ACCESS POINT FOR GRAIN CARTS

(71) Applicant: Brandt Industries Canada Ltd., Regina (CA)

(72) Inventors: Lyndon Graff, Craven (CA); Maxwell Ziegler, Regina (CA)

(73) Assignee: Brandt Industries Canada Ltd., Regina (CA)

( * ) Notice: Subject to any disclaimer, the term of this patent is extended or adjusted under 35 U.S.C. 154(b) by 858 days.

(21) Appl. No.: 17/708,150

(22) Filed: Mar. 30, 2022

(65) Prior Publication Data
US 2023/0311737 A1    Oct. 5, 2023

(51) Int. Cl.
*B60P 1/56* (2006.01)
*A01D 41/12* (2006.01)
*A01D 90/10* (2006.01)
*B60P 3/22* (2006.01)
*B60R 3/02* (2006.01)
*E06C 5/04* (2006.01)

(52) U.S. Cl.
CPC ............ *B60P 1/56* (2013.01); *A01D 41/1261* (2013.01); *A01D 90/10* (2013.01); *B60P 3/226* (2013.01); *B60R 3/02* (2013.01); *E06C 5/04* (2013.01)

(58) Field of Classification Search
CPC ............ A01D 41/1261; A01D 41/1208; A01D 90/12; A01F 12/60; B60P 3/226; B60P 1/56; B60R 3/02; E06C 5/04; E06C 5/20; E06C 1/383; E06C 9/085; E05C 19/003
See application file for complete search history.

(56) References Cited

U.S. PATENT DOCUMENTS

| 1,925,635 A | * | 9/1933 | Hartley | E02D 29/1463 |
| | | | | 16/265 |
| 3,083,784 A | * | 4/1963 | Urian | E06C 5/00 |
| | | | | 182/163 |
| 3,184,805 A | * | 5/1965 | Behlen | F16J 13/18 |
| | | | | 52/196 |
| 4,068,770 A | * | 1/1978 | Boehringer | B64C 1/22 |
| | | | | 14/71.1 |
| 4,131,293 A | * | 12/1978 | Kindle | B60R 3/02 |
| | | | | 280/166 |
| 4,784,414 A | * | 11/1988 | Free | E05C 9/08 |
| | | | | 292/52 |

(Continued)

OTHER PUBLICATIONS

Davimac Chaser Bin Parts and Operators Manual CB6713-CB10014 (Year: 2014).*

(Continued)

*Primary Examiner* — Joseph M Rocca
*Assistant Examiner* — Julia C Tran
(74) *Attorney, Agent, or Firm* — Frost Brown Todd LLP; Nicole M. Tepe (57) ABSTRACT

A grain cart having an access door. The grain cart can have a storage hopper supported on a frame and defining an interior space. The storage hopper having an upper wall; and, a lower wall extending downwards and angled inwards with an opening passing through the lower wall. The access door is sized to cover the opening and opens into the interior space. A ladder assembly is attached to the lower wall below the opening and foldable between an extended position to provide access to the opening and the access door and a retracted position.

16 Claims, 11 Drawing Sheets

(56) References Cited

U.S. PATENT DOCUMENTS

| | | | | |
|---|---|---|---|---|
| 4,979,766 | A * | 12/1990 | Wasilewski | E05C 3/24 292/52 |
| 5,474,343 | A * | 12/1995 | Ledbetter | E05C 19/003 292/259 R |
| 6,371,534 | B1 * | 4/2002 | Olson | A01D 41/1261 292/87 |
| 6,378,654 | B1 * | 4/2002 | Ziaylek, Jr. | E06C 5/02 182/127 |
| 7,735,620 | B2 * | 6/2010 | Swinderman | B65G 21/00 193/34 |
| 10,844,653 | B2 * | 11/2020 | Ivasiv | E06B 3/70 |
| 11,130,448 | B2 * | 9/2021 | Bares | B60R 3/02 |
| 2004/0159492 | A1 * | 8/2004 | Hedley | B60R 3/02 182/86 |
| 2005/0211502 | A1 * | 9/2005 | LaBrash | B60R 3/02 182/127 |
| 2007/0256893 | A1 * | 11/2007 | Horn | E06C 9/08 182/127 |
| 2009/0255758 | A1 * | 10/2009 | Farley | E06C 5/20 182/127 |
| 2013/0118832 | A1 * | 5/2013 | Hedley | E06C 5/02 182/129 |
| 2021/0324667 | A1 * | 10/2021 | Grillo | E05C 19/003 |

OTHER PUBLICATIONS

Davimac; "Davimac Chaser Bin Parts List"; From CB2811 To CB6613, Aug. 2011, 13 pages.

Kondinin; "Research Report, 30t+Chaser Bins", Feb. 2019, No. 109, "www.farmingahead.com.au", 36 pages.

* cited by examiner

GROUND LEVEL ACCESS POINT FOR GRAIN CARTS

FIELD OF THE INVENTION

The present invention relates to a grain cart and more particularly to a ground level access point for a grain cart.

BACKGROUND

Grain carts are typically used to transfer grain or other crop material from a combine harvester to a grain truck or bin. The grain cart typically comprises a storage hopper for crop material, an auger assembly for emptying crop material from the storage hopper and a set of ground wheels so that the grain cart can be towed. A tractor is commonly used to tow the grain cart and the auger assembly of the grain cart can be driven off of the power take off (PTO) of the tractor (although hydraulics, etc. could also be used to power the auger assembly).

In use, the grain cart is towed by the tractor to a combine harvester where the crop material is unloaded from the combine harvester into the grain cart. With the crop material loaded into the storage hopper of the grain cart, the tractor can tow the grain cart to a truck, trailer, storage bin, etc. and use the auger assembly to unload the crop material from the grain cart into the truck, trailer, storage bin, etc.

The storage hopper that stores the grain or other crop material is typically quite large and its sides are high. Access to the inside of this storage hopper is often desirable or even necessary for inspection and maintenance as well as to completely cleanout the storage hopper. Depending on the operation, this cleanout task can be performed daily when switching between crops materials.

Currently, access to the interior of the storage hopper on grain carts is typically gained by an external ladder that runs up the outside of the wall of the storage hopper to allow a person to climb up to the top of the storage hopper, climb over the top of the wall and then scale down the inside of the storage hopper wall using footholds or other internally placed elements in the storage hopper for just that purpose.

It is desirable to allow an operator to gain easier access to the interior of the storage hopper without having to climb up the high wall of the storage hopper and negotiate climbing into the interior while also having this access not affect the ability of the storage hopper to securely hold the crop material or place the operator in a potentially dangerous situation.

BRIEF SUMMARY

In an aspect, a grain cart having an access door is provided. The grain cart can have a frame, ground wheels for supporting the frame, a hitch assembly connected to a front end of the frame, a storage hopper supported on the frame and defining an interior space, the storage hopper having an upper wall; and, a lower walls extending downwards from the upper wall, the upper wall extending substantially vertically and the lower wall angled inwards as the lower wall extends down from the upper wall, an opening passing through the lower wall, and a ladder assembly attached to the lower wall below the opening, the ladder assembly foldable into an extended position to provide access to the opening and the access door and foldable into a retracted position. The access door is sized to cover the opening and opens into the interior space.

In a further aspect, the grain cart can have a latching assembly. The latching assembly can have a support member extending across a width of the access door, a handle provided on the support member, a first keeper provided at a first end of the support member and positioned adjacent to the periphery of the access door; a second keeper provided at a second end of the support member and provided adjacent to the periphery of the access door; a first latch assembly positioned on the lower wall adjacent to the periphery of the opening and aligned with the support member so that the first latch assembly is adjacent to the first keeper on the access door and connectable with the first keeper when the access door is closed; and a second latch assembly positioned on the lower wall adjacent to the periphery of the opening and aligned with the support member so that the first latch assembly is adjacent to the first keeper on the access door and connectable with the first keeper when the access door is closed.

DETAILED DESCRIPTION OF THE ILLUSTRATED EMBODIMENTS

Figure 1:
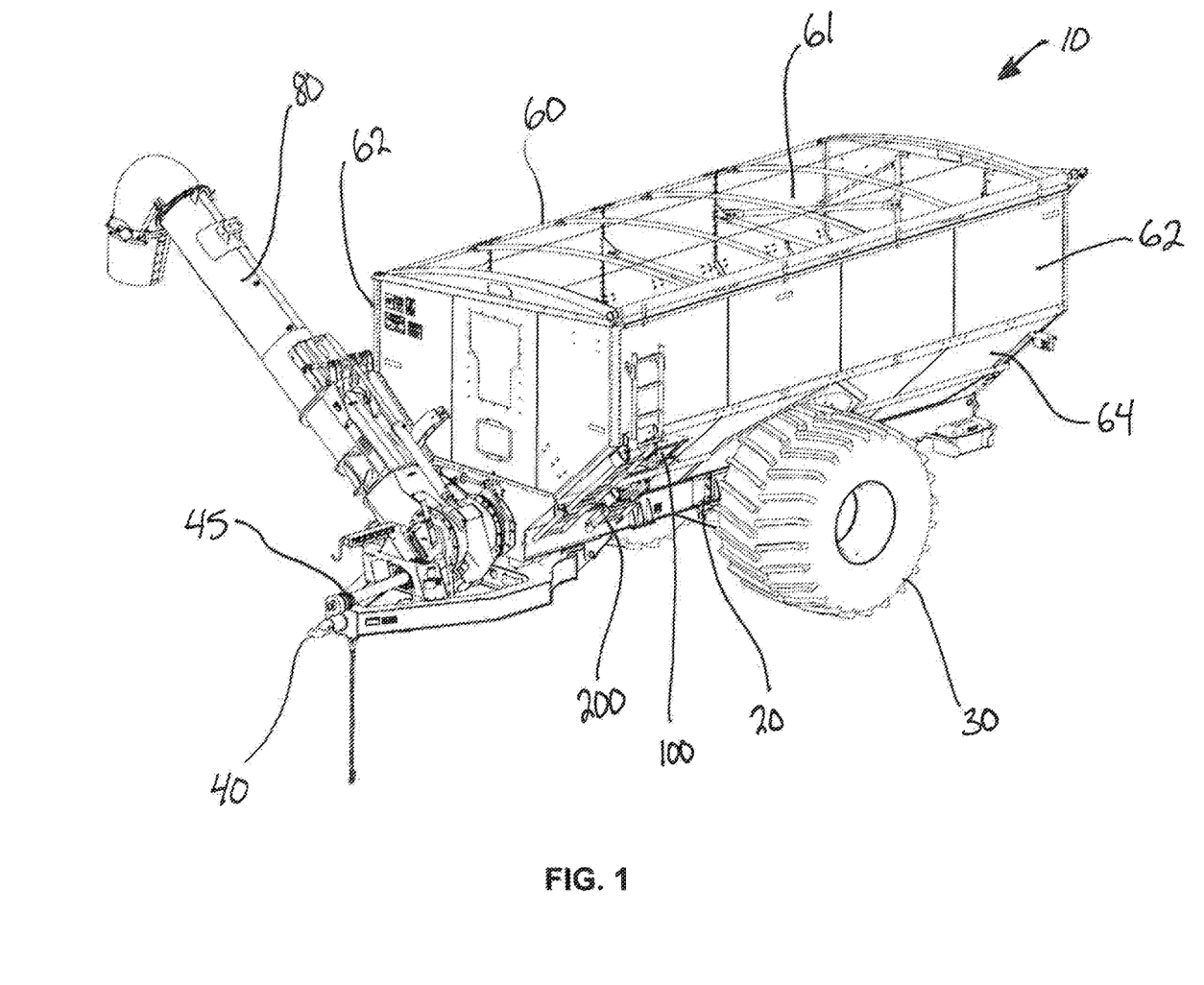
FIG. 1 is a perspective view of a grain cart.
Figure 2:
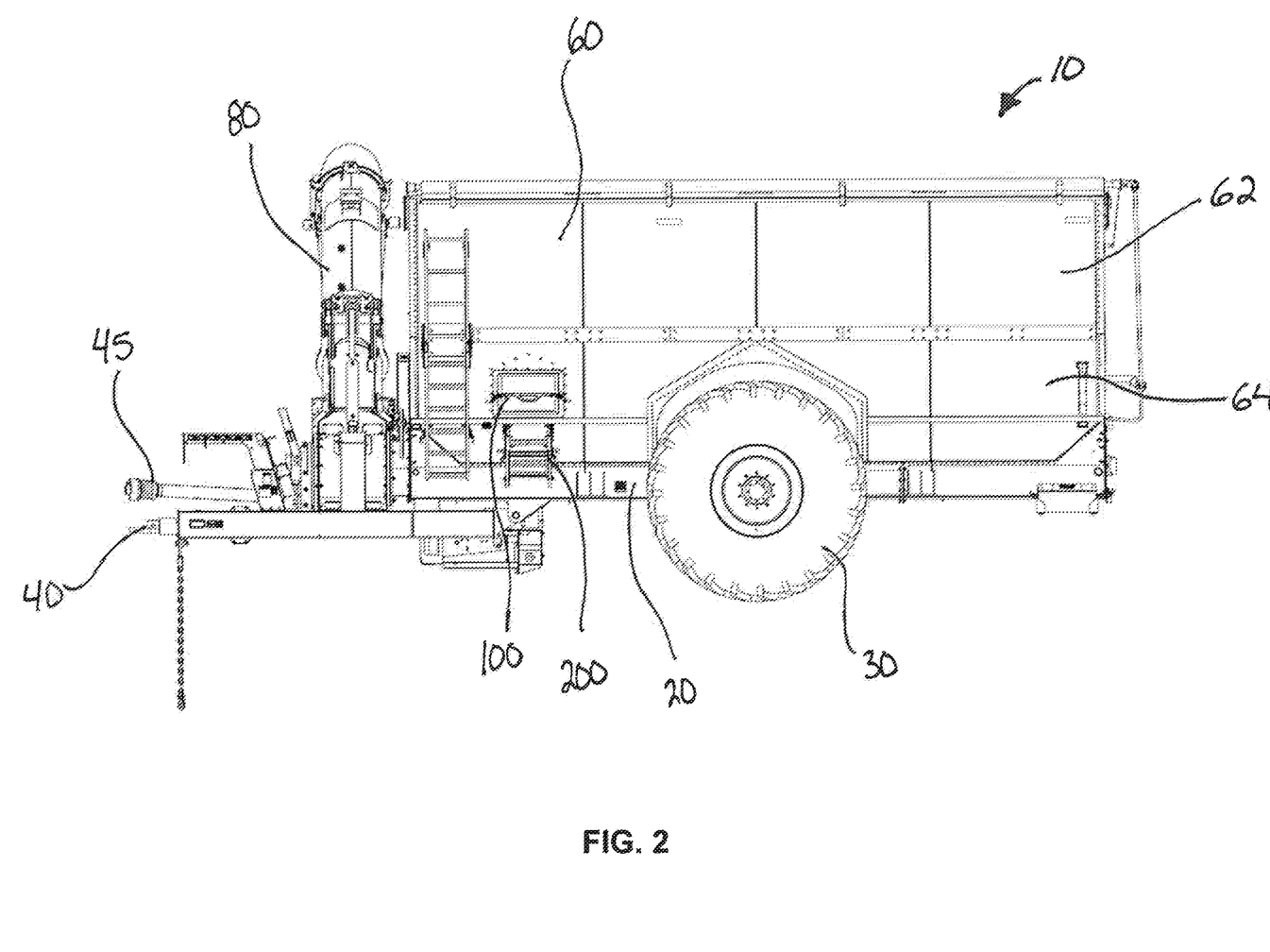
FIG. 2 is a side view of the grain cart of FIG. 1.
Figure 3:
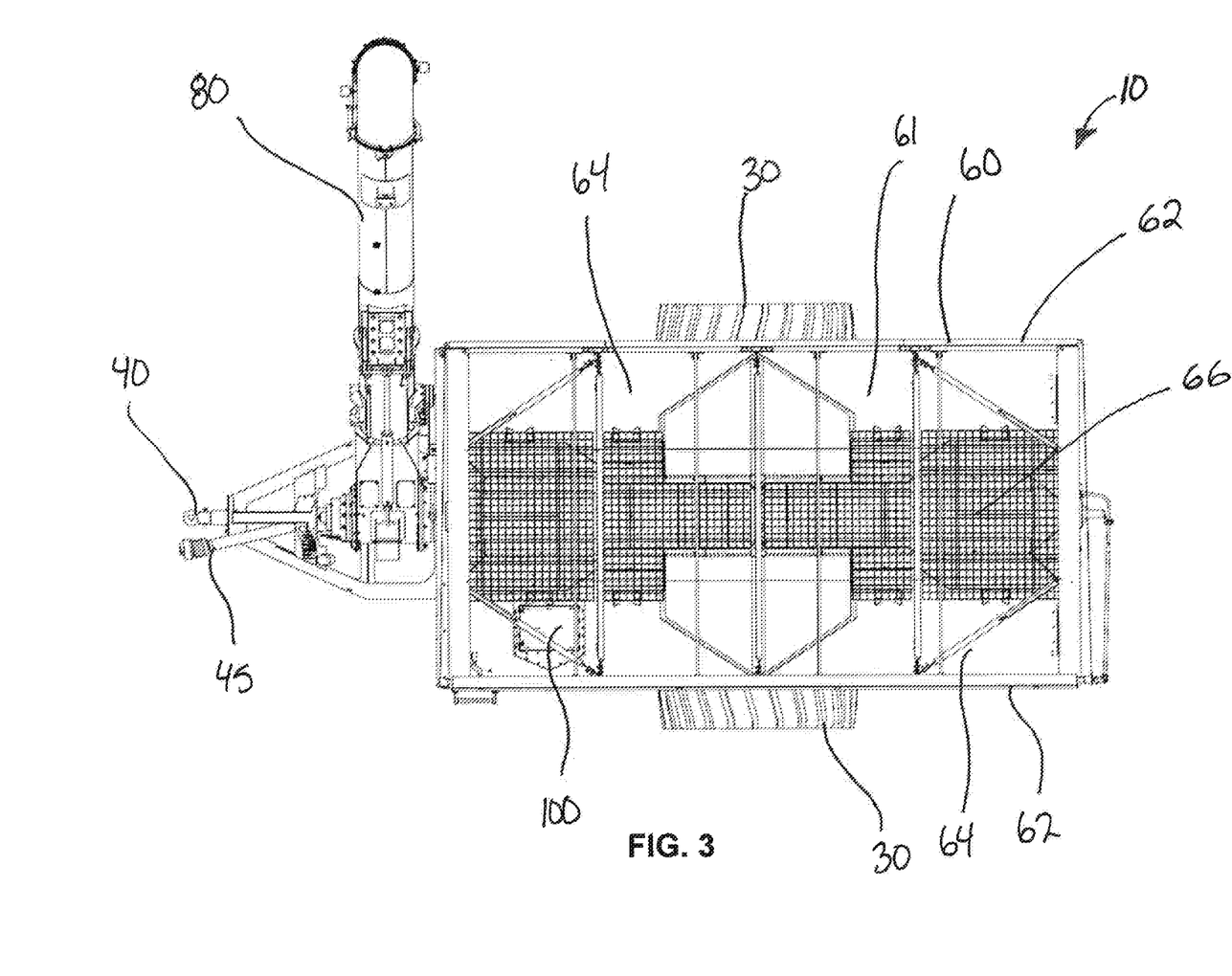
FIG. 3 is a top view of the grain cart of FIG. 1.

FIGS. 1-3 illustrates a grain cart 10 with an access door 100 to gain access to the interior of the grain cart 10. The grain cart 10 can have a frame 20, ground wheels 30, a hitch assembly 40, a storage hopper 60 for storing crop material and an auger assembly 80. Crop material can be loaded into the storage hopper 60 for transport to another location. When the grain cart 10 has been towed by a tow vehicle to the other location, the auger assembly 80 can be used to unload the crop material from the storage hopper 60 on the grain cart 10.

The frame 20 can support the storage hopper 60 and the ground wheels 30 can be operatively attached to the frame 20 to support the frame 20 above a ground surface. The grain cart 10 shown in FIGS. 1-3, has a pair of ground wheels 30, one ground wheel 30 per side, but there could also be two pairs of ground wheels in tandem. In one aspect, the ground wheels 30 may be part of a track assembly where a track encircles the ground wheels 30 on each side of the grain cart 10 to provide tracks instead of tires for the grain cart 10. The hitch assembly 40 can be connected to the front of the frame 20 and the hitch assembly 40 can be hitched to a tow vehicle, such as a tractor (not shown), to tow the grain cart 10.

A power take off (PTO) assembly 45 can be provided on the grain cart 10 that is connectable to a power take off on a tow vehicle (not shown). The PTO assembly 45 takes rotational motion transferred to it by the tow vehicle and can use this rotational motion to drive the auger assembly 80 and other assemblies on the grain cart 10.

The storage hopper 60 can have an interior space 61 for storing crop material. Upper walls 62 of the storage hopper 60 can be relatively vertical while lower walls 64 can be angled inwards, as you move downwards along the lower wall 64, to direct crop material into a center portion 66 at the bottom of the storage hopper 60. Crop material loaded into the storage hopper 60 will be directed by gravity by these angled lower walls 64 towards the center portion 66 in the bottom of the storage hopper 60.

The upper walls 62 and lower walls 64 are shown as side walls in the figures. However, the upper walls 62 and lower walls 64 could be on a front wall or a back wall of the grain cart 10.

Figure 4:
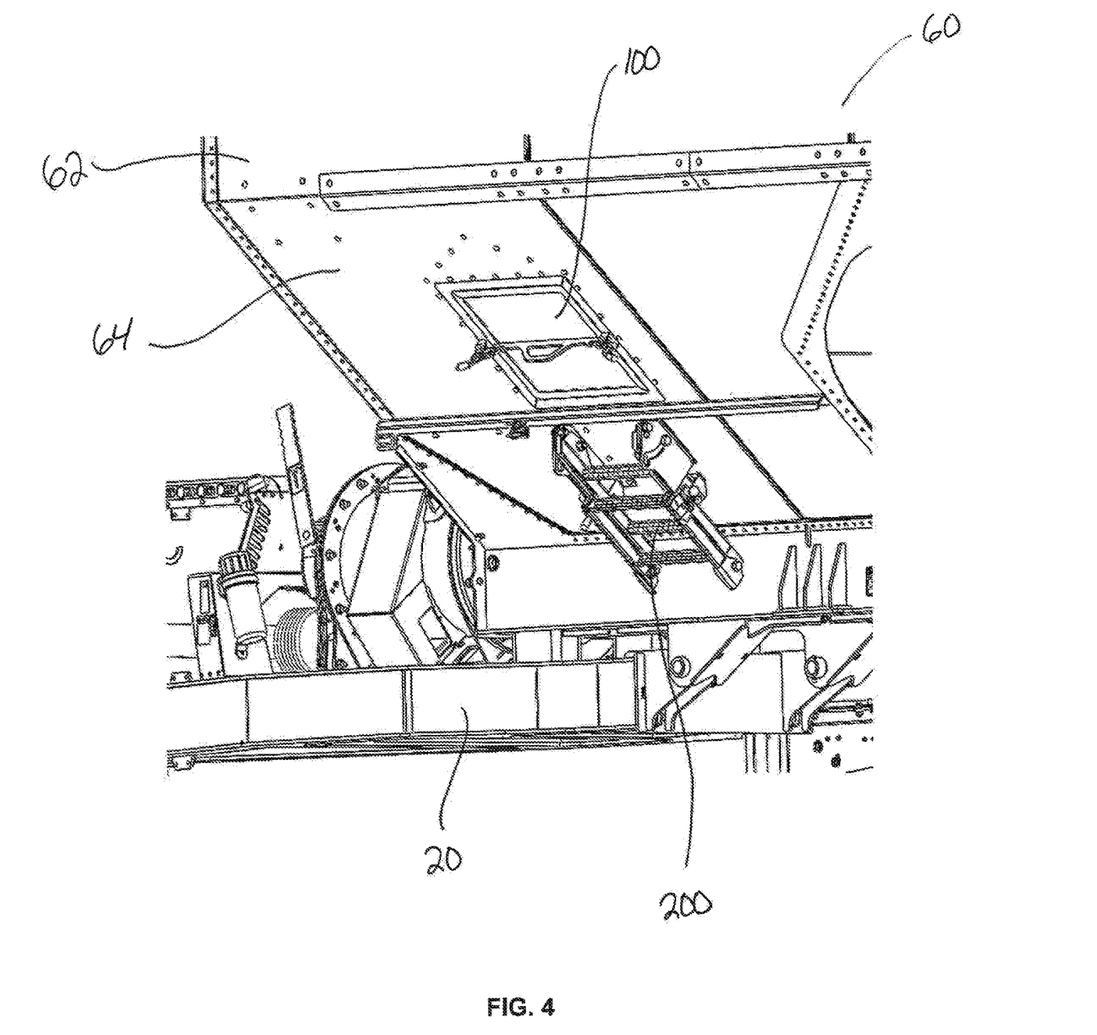
FIG. 4 is a perspective view of the access door in a closed position with the ladder assembly in the retracted position.
Figure 5:
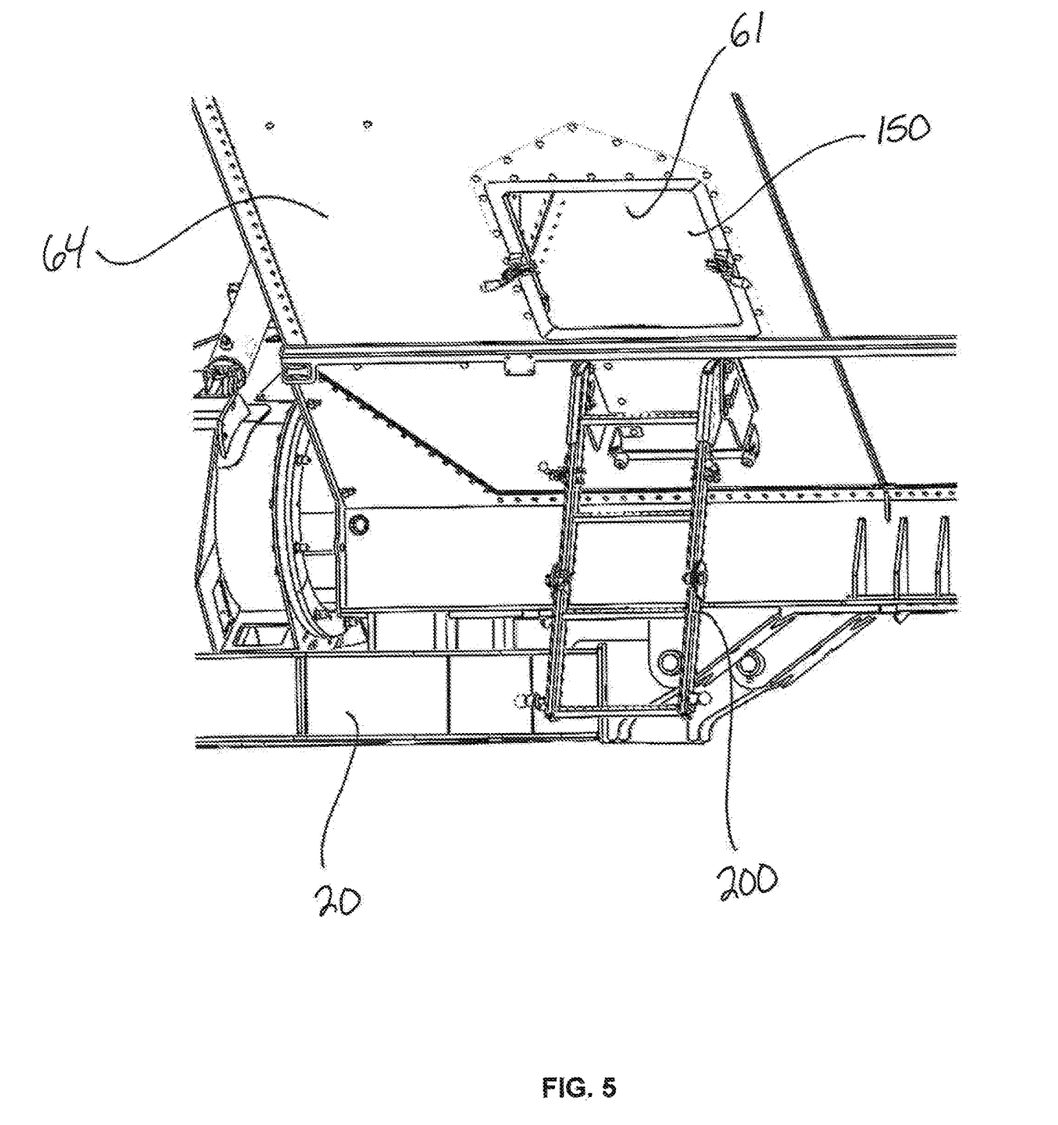
FIG. 5 is a perspective view of the access door in an open position, with the ladder assembly in an extended position.

FIG. 4 illustrates the access door 100 provided in the lower wall 64 and a ladder assembly 200 can be provided on the lower wall 64 below the access door 100 to allow a user to gain access to an interior space of the storage hopper 60. The access door 100 is shown in a closed position with the ladder assembly 200 in a retracted position in FIG. 4. FIG. 5 illustrates the access door 100 in an open position creating an opening 150 that passes through the lower wall 64 and into the interior space 61 of the storage hopper 60 while the ladder assembly 200 is in an extended position. The access door 100 opens into the interior space 61 of the storage hopper 60. The ladder assembly 200 can be folded out into this extended position to provide a person with access to the opening 150 and the access door 100 by climbing the extended ladder assembly 200 to gain access to the access door 100.

Figure 6:
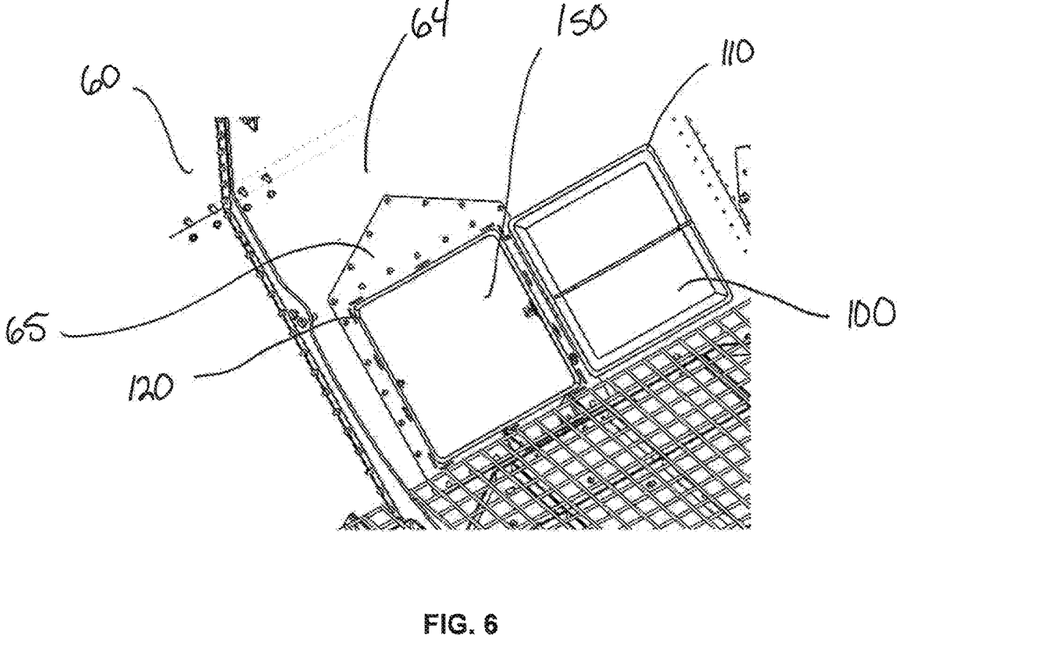
FIG. 6 is a closeup view of the access door in an open position from within the grain cart.

FIG. 6 shows the interior of the storage hopper 60 with the access door 100 open exposing the opening 150 passing through the lower wall 64 of the storage hopper 60. The access door 100 can open inwards into the interior of the storage hopper 60. An outer flange 110 can run around the periphery of the access door 100. This outer flange 110 extends greater than the opening 150; preventing the access door 100 from passing through the opening 150 because the area of the access door 100 (with the outer flange 110) is greater than the area of the opening 150 and the access door 100, and specifically the outer flange 110, extends beyond the periphery of the opening 150.

The outer flange 110 is sized to abut a flange 120 running around a periphery of the opening 150 so that the outer flange 110 of the access door 100 mates with the flange 120 running around the periphery of the opening 150 when the access door 100 is closed and positioned in the opening 150.

Figure 8A:
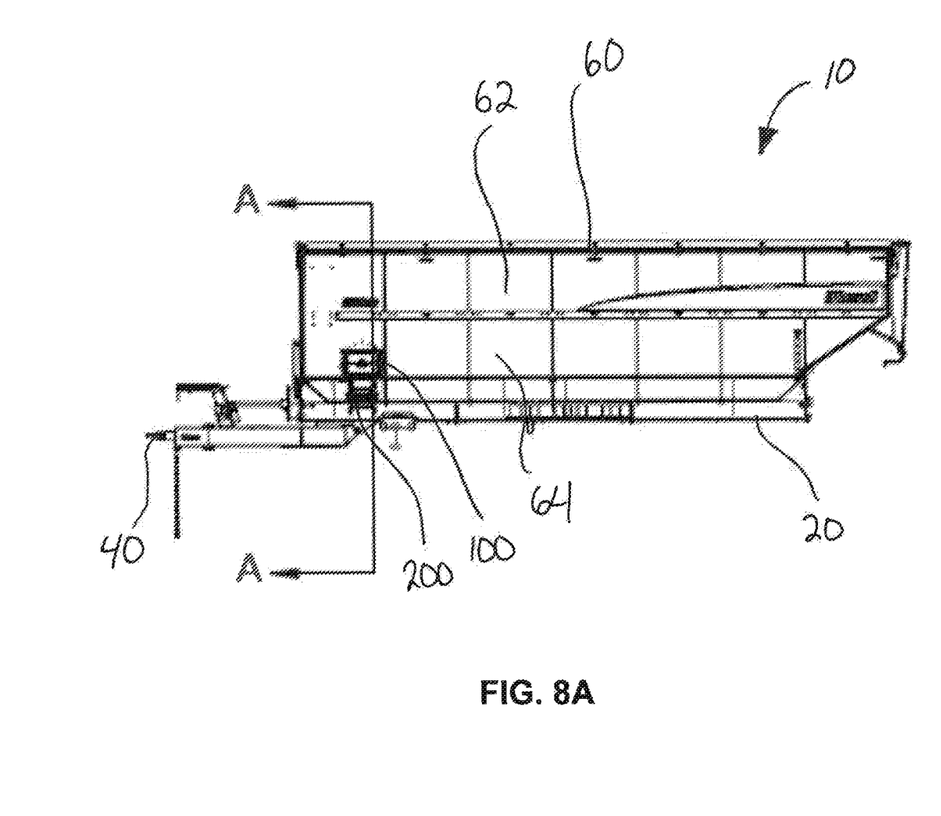
FIG. 8A is a side view of a grain cart.
Figure 8B:
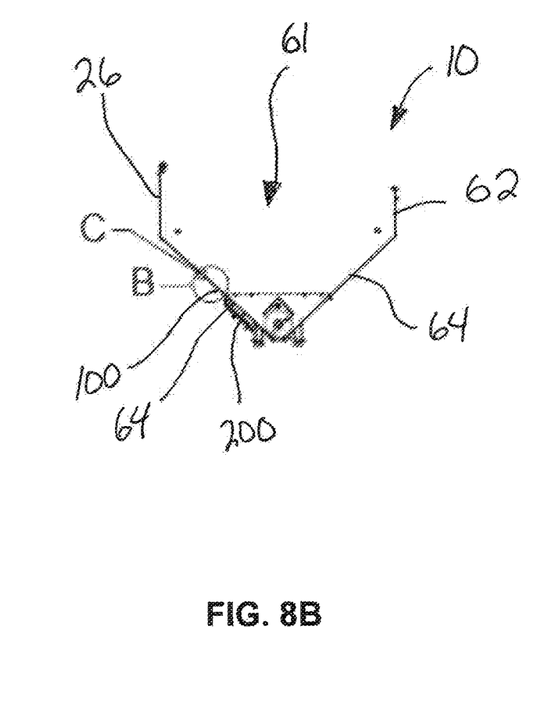
FIG. 8B is sectional view of the grain cart along line AA in FIG. 8A.
Figure 8C:
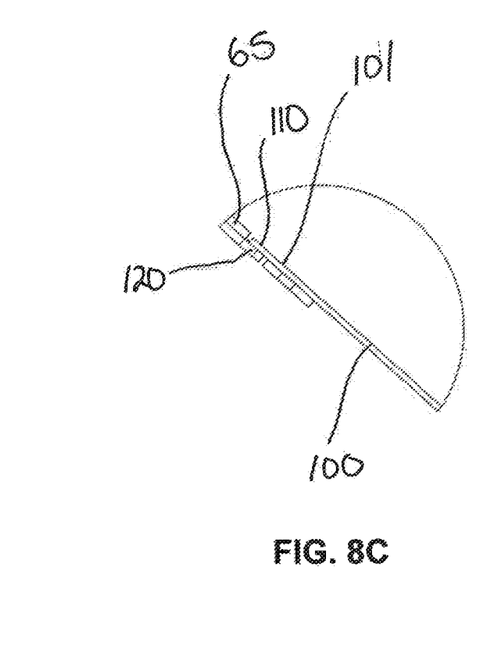
FIG. 8C is a close-up view of an edge of an access door showing an outer flange on an access door and a flange on an opening along line C in FIG. 8B.
Figure 8D:
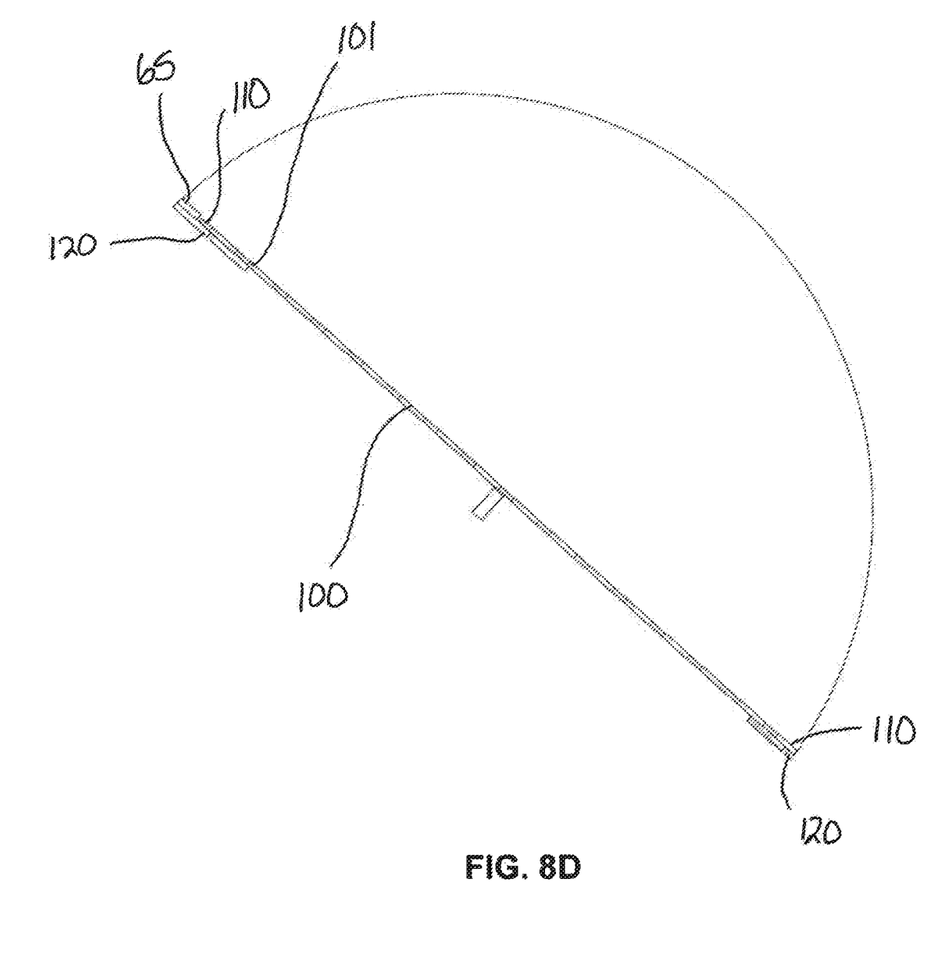
FIG. 8D is a close-up view of the access door along line D in FIG. 8B.

Referring to FIG. 8A a side view of the grain cart 10 (without the ground wheels 30 showing) is shown and FIG. 8B shows a sectional view of the grain cart 10 along line AA in FIG. 8A. The portion of the grain cart 10 indicated as C in FIG. 8B is shown as an enlarged view in FIG. 8C and the portion of the grain cart 10 indicated as B in FIG. 8B is shown in and enlarged view in FIG. 8D. FIGS. 8C and 8D show the position of the outer flange 110 on the access door 100 relative to the flange 120 on the periphery of the opening 150 when the access door 100 is closed. The flange 120 is constructed in a low profile manner in order to minimize impedance to grain flow in the storage hopper 60 as grain sits on the flange 120 or the access door 100. The flange 120 allows an inside surface 101 of the access door 100 to be substantially aligned (or flush) with an inner surface 65 of the lower wall 64 when the access door 100 is closed.

This outer flange 110 running around the periphery of the access door 100 and the flange 120 running around the periphery of the opening 150 prevents the access door 100, which opens into the storage hopper 60, from passing through the opening 150 and swinging outwards out of the storage hopper 60. In this manner, as crop material fills the storage hopper 60, the weight of the crop material in the storage hopper 60 presses against the access door 100; forcing the access door 10 closed. The weight of the crop material against the access door 100, that only swings inward, can make it hard, if not impossible, for a person to open this access door 100 when there is crop material in the storage hopper 60. The angling inward of the lower wall 64 the opening 150 and access door 100 is provided in increasing the effect of the weight of the crop material on the closed access door 100. This can prevent a person from accidentally opening the access door 100 when there is crop material in the storage hopper 60 and having the crop material spill out of the grain cart 10.

Figure 7:
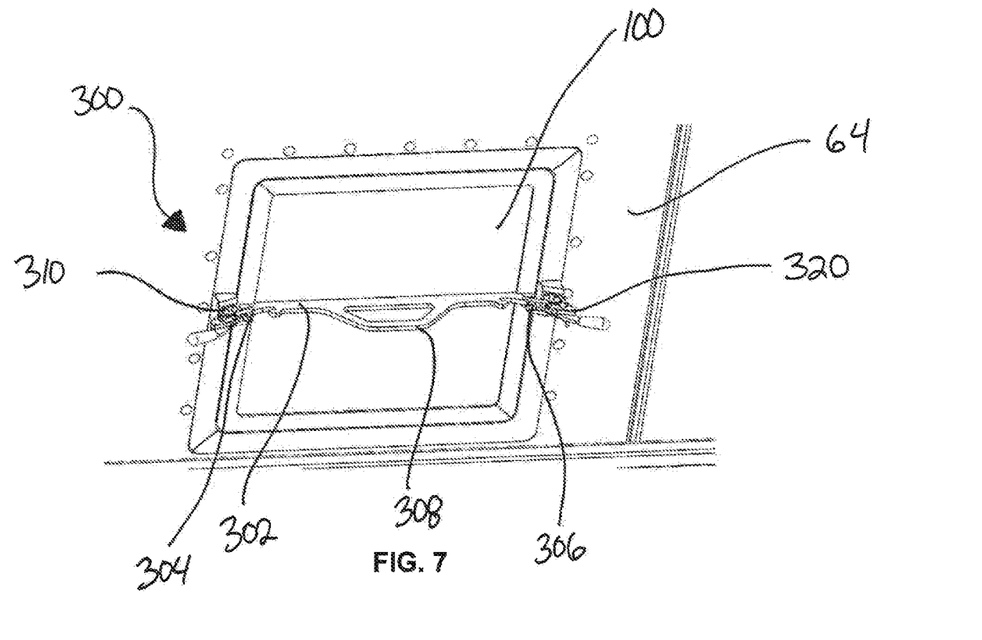
FIG. 7 is a closeup view of the access door showing a latching system for securing the access door closed.

FIG. 7 shows a latching system 300 for use in keeping the access door 100 closed when not in use. Because of the shape of the access door 100 and the use of the outer flange 120, the access door 100 cannot be opened when there is crop material filling the storage hopper 60. However, to latch the access door 100 closed, the latching system 300 can be used.

The latching system 300 can include a support member 302, having a first keeper 304, a second keeper 306, a handle 308, a first latch assembly 310, and a second latch assembly 320. The support member 302 can extend across the width of the access door 100. The keepers 304, 306 can be provided on each end of the support member 302 so that the keepers 304, 306 are positioned adjacent to the periphery of the access door 100.

The first latch assembly 310 can be provided on the lower wall 64 adjacent to the periphery of the opening 150 and aligned with the support member 302 when the access door 100 is closed so that the first latch assembly 310 is adjacent to the first keeper 304 on the access door 100 and can latch onto the first keeper 304. The second latch assembly 320 can be provided on the lower wall 64 adjacent to the periphery of the opening 150 on the opposite side of the opening 150 from the first latch assembly 310 and aligned with the support member 302 on its opposite side when the access door 100 is closed so that the second latch assembly 320 is adjacent to the second keeper 306 on the access door 100 and can latch onto the second keeper 306.

In one aspect, the first latch assembly 310 and the second latch assembly 320 can be over-center latches or toggle clamps.

Figure 9:
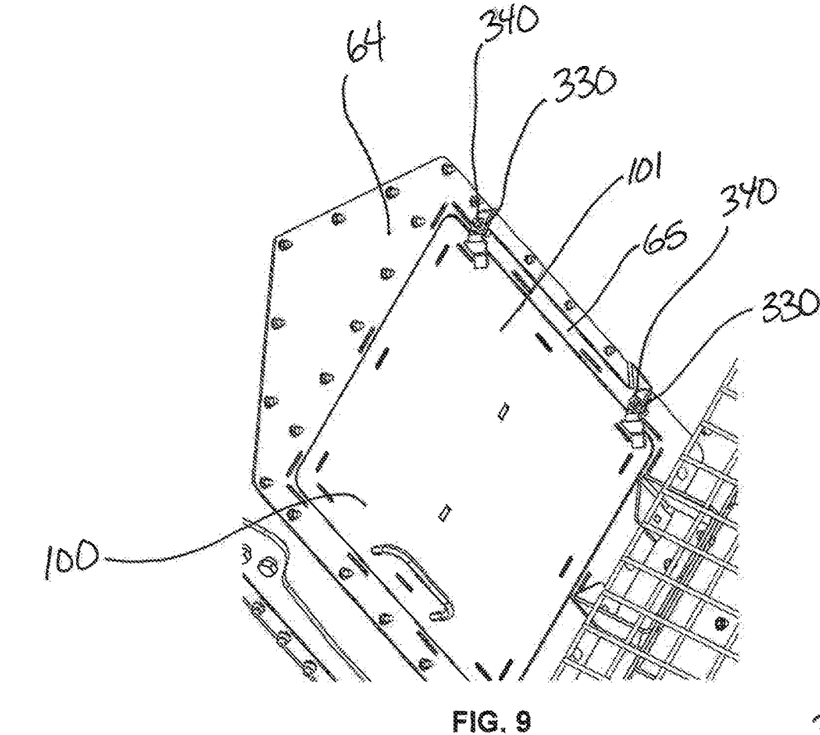
FIG. 9 is a perspective view of a hinge on the access door.
Figure 10:
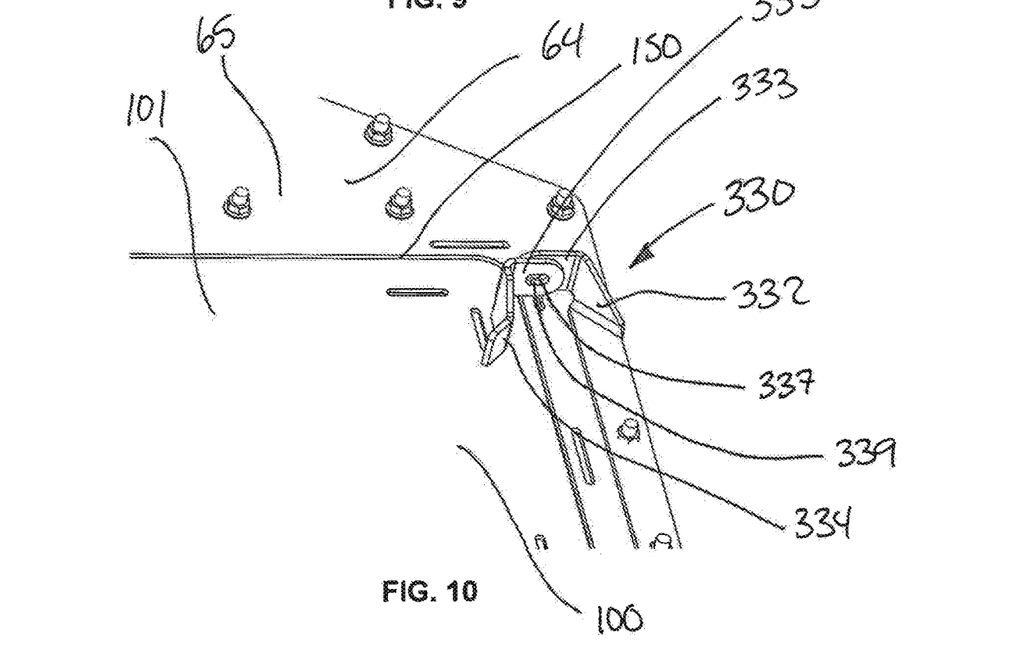
FIG. 10 is a close-up view of a the hinge of FIG. 9.

FIGS. 9 and 10, show hinges 330 that can be provided so that the inner surface 101 of the access door 100 can be substantially aligned (or flush) with the inner surface 65 of the lower wall 64, with the outer flange 110 of the access door 100 positioned in the flange 110 running around the periphery of the opening 150. The hinge 330 can have a wall leaf 332 that is attached to the inner surface 65 of the lower wall 64 adjacent to the periphery of the opening 150 in the storage hopper with a connection flange 333 forming part of the wall leaf 332. The connection flange 333 can extend perpendicularly to the lower wall 64 and have an aperture 337 extending therethrough. The hinge 330 can also have a door leaf 334 attached to the inner surface 101 of the access door 100 adjacent to the periphery of the access door 100 and the wall leaf 332 attached to the lower wall 64, with a connection flange 335, forming part of the door leaf 334, extending perpendicular to the access door 100. An aperture 339 can pass through the connection flange 335. The connection flange 333 on the wall leaf 332 can align with the connection flange 335 on the door leaf 334 so that the apertures 337, 339 can be aligned and a pin 340, such as a screw and bolt, can be provided passing through the apertures 337, 339 to allow the access door 100 to pivot around the hinges 330.

When the ladder assembly 200 is not being used to allow a person to reach the access door 100, the ladder assembly 200 can be folded up into a retracted position, as shown in FIG. 4 so that the ladder assembly 200 is out of the way when the grain cart 10 is in use. The ladder assembly 200 can then be folded out to an extended position, as shown in FIG. 5, when a person wants to gain access to the access door 100 so that the ladder assembly 200 extends towards the ground, close enough that a person can climb onto the ladder assembly 200 and use it to climb up to the access door 100.

Figure 11:
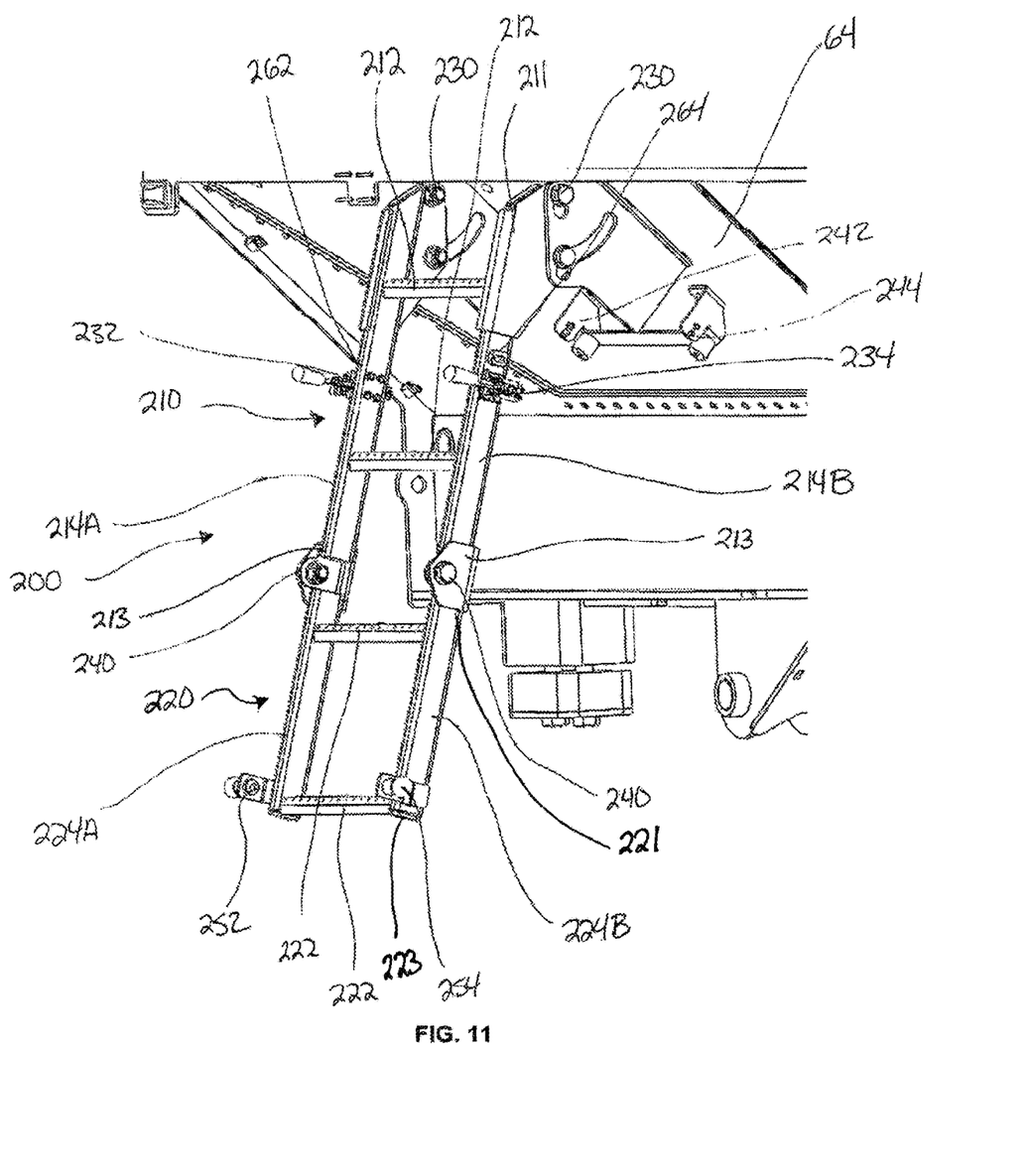
FIG. 11 is a perspective view of a ladder assembly in an extended position.
Figure 12:
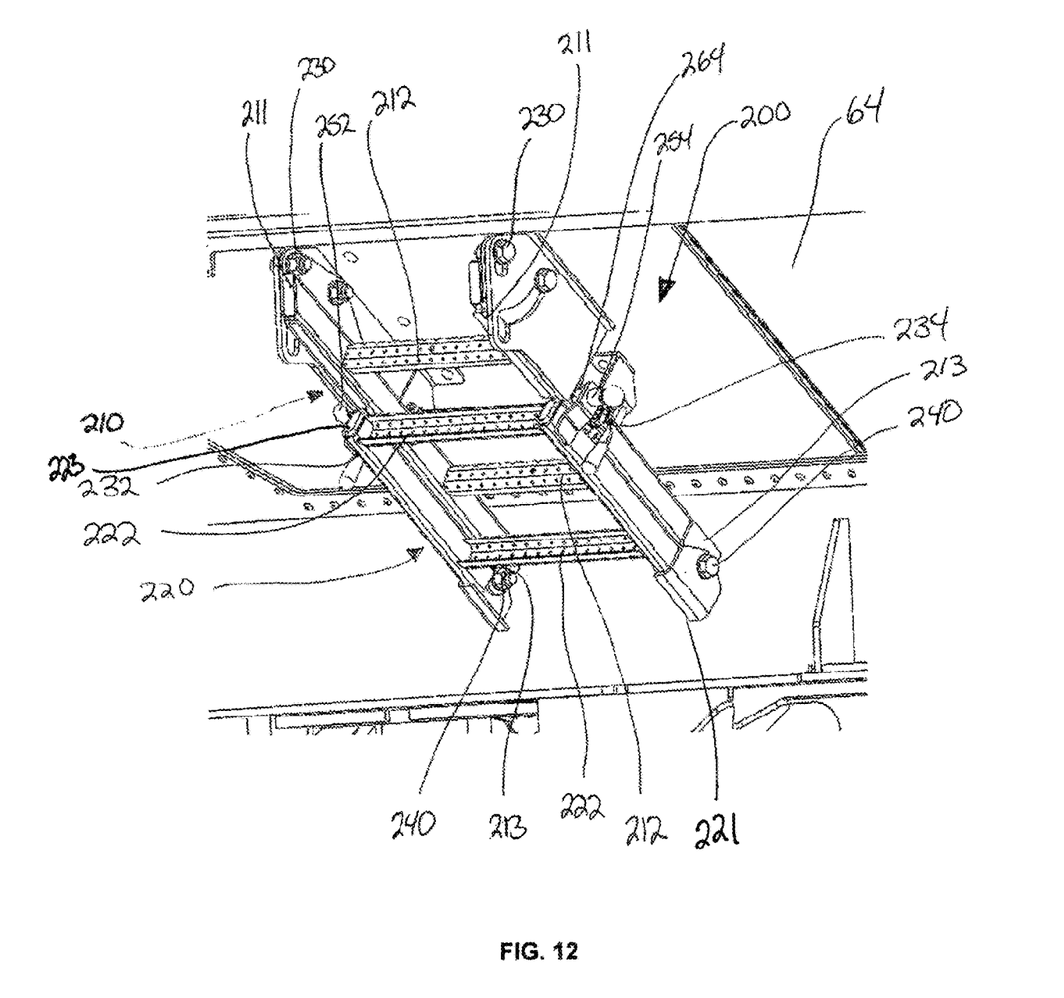
FIG. 12 is a perspective view of a ladder assembly in a retracted position.

Referring to FIGS. 11 and 12, the ladder assembly 200 can include an upper ladder portion 210, a lower ladder portion 220, a pivotal connection 230, lower pivotal connections 240 and rungs 212 extending between frame rails 214A, 214B in the upper ladder portion 210 and rungs 222 extending between frame rails 224A, 224B in the lower ladder portion 220. Upper latch assemblies 232, 234 can be provided to mate with upper connection members 242, 244 and lower latch assemblies 252, 254 can be provided to mate with lower connection members 262, 264 to hold the ladder assembly 200 in the retracted position when it is not desired for the ladder assembly 200 to be in the extended position.

The pivotal connection 230 can be attached to the lower wall 64 of the storage hopper 60 below the opening 150 and the access door 100. A top end 211 of the upper ladder portion 210 can be pivotally connected to the pivotal connection 230 and a bottom end 213 of the upper ladder portion 210 can be pivotally connected to the top end 221 of the lower ladder portion 220 by lower pivotal connections 240 which also prevent the lower ladder portion 220 from pivoting beyond straight relative to the upper ladder portion 210. A bottom end 223 of the lower ladder portion 220 can extend towards a ground surface and act as a first step for a user when the ladder assembly 200 is placed in the extended position.

The upper latch assemblies 232, 234 can be positioned on outside surfaces of frame rails 214A, 214B of the upper ladder portion 210 and positioned to mate with the upper connection members 242, 244 extending from the lower wall 64 of the storage hopper 60 when the upper ladder portion 210 is pivoted around the pivotal connection 230 and positioned adjacent to the lower wall 64 of the storage hopper 60. In this position, the upper latch assembly 232 will be aligned with the upper connection member 242 extending from the lower wall 64 of the storage hopper 60 and the upper latch assembly 234 will be aligned with the upper connection member 244 extending from the lower wall 64 of the storage hopper 60. With this alignment, the upper latch assembly 232 can be secured to the upper connection member 242 and the upper latch assembly 234 can be secured to the upper connection member 244.

In one aspect, the upper latch assemblies 232, 234 can be over-center latches or toggle clamps. The lower latch assemblies 252, 254 can be positioned on outside surfaces of frame rails 224A, 224B of the lower ladder portion 220 and positioned to mate with the lower connection members 262, 264 positioned on outside surfaces of frame rails 214A, 214B of the upper ladder portion 220 when the lower ladder portion 220 is pivoted around the bottom end 213 of the upper ladder portion 210 so that the lower ladder portion 220 is positioned adjacent to the upper ladder portion 210. In this position, the lower latch assembly 252 will be aligned with the lower connection member 262 positioned on the outside of frame rail 214A of the upper ladder portion 210 and the lower latch assembly 254 will be aligned with the lower connection member 264 positioned on the outside of frame rail 214B of the upper ladder portion 210. The lower latch assembly 252 can be secured to the lower connection member 262 and the lower latch assembly 254 can be secured to the lower connection member 264 to secure the lower ladder portion 220 adjacent to the upper ladder portion 210.

To fold the ladder assembly 200 into the folded position, as shown in FIG. 12, the upper ladder portion 210 can be pivoted around the pivotal connection 230, adjacent to the lower wall 64 of the storage hopper 60, and the lower ladder portion 220 can be pivoted around the top end 221 of the lower ladder portion 220 and therefore also the bottom end 213 of the upper ladder portion 210.

The lower ladder portion 220 can be pivoted around the bottom end 213 of the upper ladder portion 210. When the lower ladder portion 220 is positioned adjacent to the upper ladder portion 210, the lower latch assemblies 252, 254 can be connected to the lower connection members 262, 264 to secure the lower ladder portion 210 in this position.

The connected lower ladder portion 220 and the upper ladder portion 210 can be pivoted around the pivotal connection 230 until the upper latch assemblies 232, 234 can be connected to the upper connection members 242, 244 extending from the lower wall 64 of the storage hopper 60 to secure the ladder assembly 200 in the retracted position.

To unfold the ladder assembly 200 into the extended position, the upper latch assemblies 232, 234 can be disconnected from the upper connection members 242, 244 to pivot the upper ladder portion 210 (and therefore the lower ladder portion 220) downwards, away from the lower wall 64 of the storage hopper 60, and the lower latch assemblies 252, 254 can be disconnected to rotate the lower ladder portion 220 away from the upper ladder portion 210 around the lower pivotal connections 240. The upper ladder portion 210 and the lower ladder portion 220 can be rotated until the upper ladder portion 210 and the lower ladder portion 220 extend linearly and are held in alignment by the lower pivotal connections 240 in the extended position to form a longer ladder and allowing a user to climb the ladder assembly 200 and up to the access door 100.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

The invention claimed is:

1. A grain cart comprising:
   a frame;
   ground wheels for supporting the frame;
   a hitch assembly connected to a front end of the frame;
   a storage hopper supported on the frame and defining an interior space, the storage hopper having an upper wall; and, a lower wall extending downwards from the upper wall, the upper wall extending substantially vertically and the lower wall angled inwards as the lower wall extends down from the upper wall;
   an opening passing through the lower wall;
   an access door sized to cover the opening and opening into the interior space; and
   a ladder assembly directly and pivotally attached at a top end of the ladder to the inwardly angled lower wall by a pivotal connection below the opening, the ladder assembly comprising:
      an upper ladder portion having: a top end corresponding to the top end of the ladder; and, a bottom end; and
      a lower ladder portion having: a top end; and, a bottom end, the top end pivotally connected at a lower connection point to the bottom end of the upper ladder portion,
   wherein the ladder assembly is unfoldable into an extended position to provide access to the opening and the access door by pivoting the lower ladder portion around the lower connection point and away from the upper ladder portion,
   and wherein the ladder assembly is foldable into a retracted position by pivoting the lower ladder portion around the lower connection point and towards the upper ladder portion, and pivoting the ladder assembly around the pivotal connection, towards the lower wall below the pivotal connection, until the ladder position is positioned adjacent to the lower wall below the opening.

2. The grain cart of claim 1 further comprising:
   a flange running around the periphery of the opening; and
   an outer flange running around a periphery of the access door,
   wherein the outer flange is sized to abut the flange on the opening when the access door is closed, preventing the access door from swinging outwards from the storage hopper.

3. The grain cart of claim 2 wherein the outer flange of the access door mates with the flange of the opening when the access door is closed.

4. The grain cart of claim 3 wherein an inner surface of the access door is substantially aligned with an inner surface of the lower wall when the access door is closed.

5. The grain cart of claim 1 further comprising a latching assembly, the latching assembly comprising:
   a support member extending across a width of the access door; a handle provided on the support member;
   a first keeper provided at a first end of the support member and positioned adjacent to the periphery of the access door;
   a second keeper provided at a second end of the support member and provided adjacent to the periphery of the access door;
   a first latch assembly positioned on the lower wall adjacent to the periphery of the opening and aligned with the support member so that the first latch assembly is adjacent to the first keeper on the access door and connectable with the first keeper when the access door is closed; and
   a second latch assembly positioned on the lower wall adjacent to the periphery of the opening and aligned with the support member so that the second latch assembly is adjacent to the second keeper on the access door and connectable with the second keeper when the access door is closed.

6. The grain cart of claim 5 wherein the first latch assembly and the second latch assembly are over-center latches.

7. The grain cart of claim 5 wherein the first latch assembly and the second latch assembly are toggle clamps.

8. The grain cart of claim 1 further comprising a hinge, the hinge comprising:
   a wall leaf attached to an inner surface of the lower wall, adjacent to the periphery of the opening, the wall leaf having: a connection flange extending perpendicular to the lower wall; and, an aperture passing through the connection flange;
   a door leaf attached to an inner surface of the access door adjacent to the periphery of the access door and adjacent to the wall leaf, the door leaf having: a connection flange extending perpendicular to the access door; and, an aperture passing through the connection flange; and
   a pin passing through the aperture in the connection flange of the wall leaf and the aperture in the connection flange of the door leaf.

9. The grain cart of claim 1 wherein the ladder assembly further comprises:
   rungs extending between frame rails in the upper ladder portion; and
   rungs extending between frame rails in the lower ladder portion.

10. The grain cart of claim 9 further comprising:
    upper connection members;
    upper latch assemblies positioned to attach to the upper connection members when the ladder assembly is in the retracted position;
    lower connection members; and
    lower latch assemblies positioned to attach to the lower connection members when the ladder assembly is in the retracted position.

11. The grain cart of claim 10 wherein the upper latch assemblies are positioned on outside surfaces of the frame rails of the upper ladder portion, and wherein the upper connection members extend from the lower wall of the storage hopper, and wherein the upper latch assemblies are positioned to connect with the upper connection members when the ladder assembly is in the retracted position.

12. The grain cart of claim 11 wherein the lower connection members are positioned on the outside surfaces of the frame rails of the upper ladder portion, and wherein the lower latch assemblies are positioned on outside surfaces of the frame rails of the lower ladder portion, and wherein the lower latch assemblies positioned to connect with the lower connection members when the ladder assembly is in the retracted position.

13. The grain cart of claim 1 further comprising a power take off assembly.

14. The grain cart of claim 13 further comprising an auger assembly.

15. The grain cart of claim 1 wherein unfolding the ladder assembly into the extended position further comprises pivoting the ladder assembly around the pivotal connection, away from the lower wall below the opening, and wherein folding the ladder assembly into the retracted position further comprises pivoting the ladder assembly around the pivotal connection, towards the lower wall below the opening.

16. The grain cart of claim 1 further comprising at least one upper connection member extending from the lower wall of the storage hopper, below the opening, and secureable to the ladder assembly to hold the ladder assembly adjacent to the lower wall when the ladder assembly is in the retracted position.

* * * * *